(12) United States Patent
Li et al.

(10) Patent No.: US 11,074,751 B2
(45) Date of Patent: Jul. 27, 2021

(54) 3D HAIR SYNTHESIS USING VOLUMETRIC VARIATIONAL AUTOENCODERS

(71) Applicant: University of Southern California, Los Angeles, CA (US)

(72) Inventors: Hao Li, Los Angeles, CA (US); Liwen Hu, Los Angeles, CA (US); Shunsuke Saito, Los Angeles, CA (US)

(73) Assignee: UNIVERSITY OF SOUTHERN CALIFORNIA, Los Angeles, CA (US)

(*) Notice: Subject to any disclaimer, the term of this patent is extended or adjusted under 35 U.S.C. 154(b) by 0 days.

(21) Appl. No.: 16/703,582

(22) Filed: Dec. 4, 2019

(65) Prior Publication Data
US 2020/0175757 A1 Jun. 4, 2020

Related U.S. Application Data

(60) Provisional application No. 62/775,301, filed on Dec. 4, 2018.

(51) Int. Cl.
*G06T 17/20* (2006.01)
*G06T 19/20* (2011.01)
*G06T 7/10* (2017.01)

(52) U.S. Cl.
CPC .............. *G06T 17/20* (2013.01); *G06T 7/10* (2017.01); *G06T 19/20* (2013.01); *G06T 2207/20084* (2013.01); *G06T 2207/30196* (2013.01); *G06T 2219/2004* (2013.01)

(58) Field of Classification Search
CPC .......... G06T 17/20; G06T 19/20; G06T 7/10; G06T 2219/2004; G06T 2207/30196; G06T 2207/20084; G06T 15/00; G06T 17/00
See application file for complete search history.

(56) References Cited

U.S. PATENT DOCUMENTS

| 6,453,052 B1* | 9/2002 | Kurokawa | G06T 11/00 30/30 |
| 10,373,055 B1* | 8/2019 | Matthey-de-l'Endroit | G06N 3/0454 |
| 2012/0075331 A1* | 3/2012 | Mallick | G06T 11/001 345/594 |

OTHER PUBLICATIONS

Chai, M, Shao, T, Wu, H et al., "AutoHair: Fully Automatic Hair Modeling from A Single Image", ACM Transactions on Graphics, 35 (4), ARTN 116. ISSN 0730-0301 (Year: 2016).*

(Continued)

*Primary Examiner* — William A Beutel
(74) *Attorney, Agent, or Firm* — Snell & Wilmer LLP

(57) ABSTRACT

Devices and methods for single-view 3D hair modeling are disclosed. The method for single-view 3D hair modeling includes training, by a neural network processor, a volumetric autoencoder to encode a plurality of 3D hairstyles into latent features, and to generate an output based on the latent features. The method for single-view 3D hair modeling includes training, by the neural network processor, an embedding network to determine hair coefficients of a single hairstyle from an input image. The method for single-view 3D hair modeling includes receiving, by the neural network processor, the input image. The method for single-view 3D hair modeling includes synthesizing, by the neural network processor, hair strands to generate a single-view 3D model of the single hairstyle based on the volumetric autoencoder, the embedding network, and the input image.

17 Claims, 11 Drawing Sheets

(56) References Cited

OTHER PUBLICATIONS

Tan, Qingyang, et al., "Variation Autoencoders for Deforming 3D mesh Models", Proceedings of the IEEE Conference on Computer Vision and Pattern Recognition, CVPR 2018, pp. 5841-5850, Jun. 18-22, 2018 (Year: 2018).*

* cited by examiner

3D HAIR SYNTHESIS USING VOLUMETRIC VARIATIONAL AUTOENCODERS

CROSS-REFERENCE TO RELATED APPLICATIONS

This application claims the benefit and priority of U.S. Provisional Application Ser. No. 62/775,301, entitled "3D HAIR SYNTHESIS USING VOLUMETRIC VARIATIONAL AUTOENCODERS," filed on Dec. 4, 2018, the entire disclosure of which is hereby incorporated by reference herein in its entirety.

STATEMENT AS TO FEDERALLY SPONSORED RESEARCH

This invention was made with government support under contract number W911NF-14-D-0005 awarded by the Army Research Laboratory (ARL). The government has certain rights in this invention.

BACKGROUND

1. Field

The present disclosure relates to systems and methods for hair and, more particularly, to three-dimensional hair modeling.

2. Description of the Related Art

In computer graphics, the 3D acquisition of human hair has become an active research area. In order to make the creation of digital humans, e.g., electronic representations of people such as in electronic games or for other purposes, more efficient, automated, and cost effective, hair capture techniques may be used. High-end hair capture techniques may be based on specialized hardware. The techniques may produce high-quality 3D hair models but may only operate in well-controlled studio environments. More consumer-friendly techniques, such as those that only require a single input image, are becoming increasingly popular and important as they may facilitate the mass adoption of new 3D avatar-driven applications, including personalized gaming, communication in virtual reality (VR), and social media applications. Existing single-view hair modeling methods all rely on a large database containing hundreds of 3D hairstyles, which may provide an initial hair shape prior to further refinement. The large database containing hundreds of 3D hairstyles may be needed to handle the complex variations of possible hairstyles.

Starting from a large database containing hundreds of 3D hairstyles has several fundamental limitations. First, the large storage footprint of the hair model database prohibits the hair model database's deployment on resource-constrained platforms such as mobile devices. Second, the search steps are usually slow and difficult to scale as the database grows to handle an increasing variety of hairstyles. Third, using a large database containing hundreds of 3D hairstyles also relies on well-conditioned input photographs and may be susceptible to the slightest failures during the image pre-processing and analysis step, such as failed face detection, incorrect head pose fitting, or poor hair segmentation. Furthermore, the data-driven algorithms may be based on hand-crafted descriptors and do not generalize well beyond the data-driven algorithm's designed usage scenarios. They often fail in practical scenarios, such as those with occluded face, occluded hair, or both occluded face and hair, poor resolution, degraded quality, or artistically stylized input.

To address the above challenges, an end-to-end single-view 3D hair synthesis approach using a deep generative model to represent the continuous space of hairstyles is proposed.

SUMMARY

Devices and methods for single-view 3D hair modeling are disclosed. A method for single-view 3D hair modeling includes training, by a neural network processor, a volumetric autoencoder to encode a plurality of 3D hairstyles into latent features, and to generate an output based on the latent features. The method for single-view 3D hair modeling also includes training, by the neural network processor, an embedding network to determine hair coefficients of a single hairstyle from an input image. Additionally, the method for single-view 3D hair modeling includes receiving, by the neural network processor, the input image. The method for single-view 3D hair modeling also includes synthesizing, by the neural network processor, hair strands to generate a single-view 3D model of the single hairstyle based on the volumetric autoencoder, the embedding network, and the input image.

A device for single-view 3D hair modeling includes a neural network processor. The device also includes a memory, coupled to the neural network processor. The memory includes instructions causing the neural network processor to train a volumetric autoencoder to encode a plurality of 3D hairstyles into latent features, and to generate an output based on the latent features. The memory also includes instructions causing the neural network processor to train an embedding network to determine hair coefficients of a single hairstyle from an input image. Additionally, the memory includes instructions causing the neural network processor to receive the input image. The memory also includes instructions causing the neural network processor to synthesize hair strands to generate a single-view 3D model of the single hairstyle based on the volumetric autoencoder, the embedding network, and the input image.

A method for single-view 3D hair modeling includes encoding a plurality of 3D hairstyles into latent features. Additionally, the method includes generating an output based on the latent features. The method also includes determining hair coefficients of a single hairstyle from an input image. Additionally, the method includes receiving the input image. The method also includes generating a single-view 3D model of the single hairstyle based on the volumetric autoencoder, the embedding network, and the input image.

BRIEF DESCRIPTION OF THE DRAWINGS

Other systems, methods, features, and advantages of the present invention will be or will become apparent to one of ordinary skill in the art upon examination of the following figures and detailed description.

DETAILED DESCRIPTION

Figure 1:
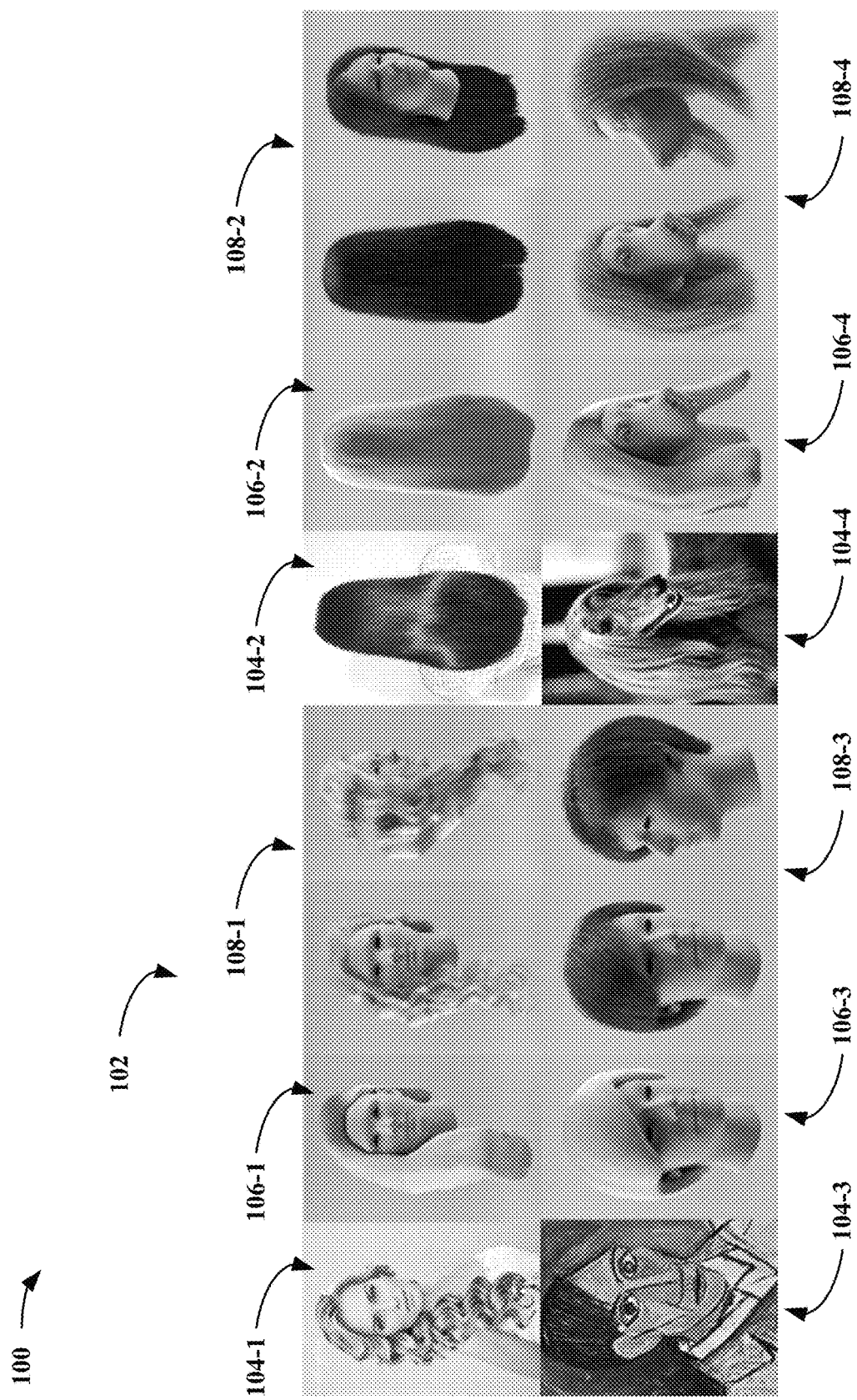
FIG. 1 is a diagram illustrating examples of facial images including hair.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

As discussed above, the 3D acquisition of human hair has become an active research area in computer graphics. An end-to-end single-view 3D hair synthesis approach using a deep generative model to represent the continuous space of hairstyles is proposed. The continuous space of hairstyles using a compact generative model so that plausible hairstyles may be effectively sampled and interpolated may be implicitly modeled, and hence, eliminate the need for a comprehensive database. End-to-end training and 3D hairstyle inference from a single input image by learning deep features from a large set of unconstrained images is proposed in one example embodiment.

Recent advances in single-view 3D hair digitization have made the creation of high-quality computer generated (CG) characters scalable and accessible to end-users, enabling new forms of personalized virtual reality (VR) and gaming experiences. To handle the complexity and variety of hair structures, most techniques rely on the successful retrieval of a particular hair model from a comprehensive hair database. Not only are the aforementioned data-driven methods storage intensive, but they may also be prone to failure for highly unconstrained input images, complicated hairstyles, and failed face detection. Instead of using a large collection of 3D hair models directly, it is proposed to represent the manifold of 3D hairstyles implicitly through a compact latent space of a volumetric variational autoencoder (VAE). An example deep neural network may be trained with volumetric orientation field representations of 3D hair models and may synthesize new hairstyles from a compressed code. To enable an end-to-end 3D hair inference, an additional embedding network may be trained to predict the code in the VAE latent space from any input image. Strand-level hairstyles may then be generated from the predicted volumetric representation. An example fully automatic framework does not require any ad-hoc face fitting, intermediate classification and segmentation, or hairstyle database retrieval. An example hair synthesis approach may be significantly more robust and may handle a much wider variation of hairstyles than data-driven hair modeling techniques with challenging inputs, including photos that are low-resolution, overexposed, or contain extreme head poses. The storage requirements may be minimal, and a 3D hair model may be produced from an image quickly, e.g., generally in one second or less, depending on processing availability. Evaluations also illustrate that successful reconstructions may be possible from highly stylized cartoon images, non-human subjects, and pictures taken from behind a person. An example approach may be particularly well suited for continuous and plausible hair interpolation between very different hairstyles.

FIG. 1 is a diagram illustrating examples of facial images 100 including hair. In the examples of FIG. 1, a post-processing step is applied to the top-left example 102. The systems and methods described herein may automatically generate 3D hair strands from a variety of single-view inputs. The panels of FIG. 1, from left to right, illustrate an input image 104 (104-1, 104-2, 104-3, 104-4), a volumetric representation 106 (106-1, 106-2, 106-3, 106-4) with color-coded local orientations (e.g., represented in greyscale herein) predicted using the systems and methods described herein, and final synthesized hair strands rendered from two viewing points 108 (108-1, 108-2, 108-3, 108-4).

To effectively model the space of hairstyles, the use of volumetric occupancy and flow fields to represent 3D hairstyles may be introduced to provide an example generative hair modeling framework. A variant of VAE is presented to learn the mapping from a compact latent space to the space of hairstyles represented by a volumetric representation of a large database of hairstyles.

To achieve an end-to-end 3D hair inference, an additional hair embedding neural network may be trained to predict the code in the learned VAE latent space from input images. Instead of direct prediction to the latent space, Principled Component Analysis (PCA) in the latent space for an embedding subspace may be performed to achieve better generalization performance via prediction to the subspace. In addition, Iterative Error Feedback (IEF) may be applied to an example embedding network to further facilitate generalization.

An ablation study of different algorithmic components may be used to validate an example proposed architecture. An example method may synthesize faithful 3D hairstyles from a wide range of input images with various occlusions, degraded image quality, extreme lighting conditions, uncommon hairstyles, and significant artistic abstraction. An example technique may be compared to the latest algorithm for single-view 3D hair modeling and illustrate that an example approach may be significantly more robust on challenging input photos. Using an example learned generative model, plausible hairstyles are interpolated effectively between drastically different ones in some cases, while some other methods fail.

An example embodiment may be the first end-to-end framework for synthesis of 3D hairstyles from a single input image without a requirement for face detection or hair segmentation. The example embodiment may handle a wider range of hairstyles and may be significantly more robust for challenging input images than existing data-driven techniques.

The example embodiment may include a variational autoencoder using a volumetric occupancy and flow field representation. The corresponding latent space may be compact and may model the wide range of possible hairstyles continuously. Plausible hairstyles may be sampled and interpolated effectively using this VAE-based generative model. The plausible hairstyles may also be converted into a strand-based hair representation. The example embodiment may include a hair embedding network with robust generalization performance using PCA embedding and an iterative error feedback technique.

The creation of high-quality 3D hair models may be one of the most time-consuming tasks when modeling CG characters. Despite the availability of various design tools and commercial solutions such as XGEN, Ornatrix and HairFarm, production of a single 3D hair model for a hero character may take hours or even days for professional character artists.

For multi-view hair capture, hair digitization techniques have been introduced in attempts to reduce and eliminate the laborious and manual effort of 3D hair modeling. Most high-end 3D hair capture systems maximize the coverage of hair during acquisition and may be performed under controlled lighting conditions. One multi-view stereo technique illustrates that, for the first time, highly complex real-world hairstyles may be convincingly reconstructed in 3D by discovering locally coherent wisp structures. One technique proposes a data-driven variant using pre-simulated hair strands, which may eliminate the generation of physically implausible hair strands. Follow-up work may solve the problem of capturing constrained hairstyles such as braids using procedurally generated braid structures. An example may use an RGB-D sensor that may be swept around the subjects instead of a collection of calibrated cameras. One example proposes a generalized four-view image-based hair modeling method that does not require all views to be from the same hairstyle, which allows the creation of new hair models. The multi-view capture systems may not be easily accessible to end-users, however, because the multi-view capture systems often require expensive hardware equipment, controlled capture settings, and professional manual clean-up.

Figure 2:
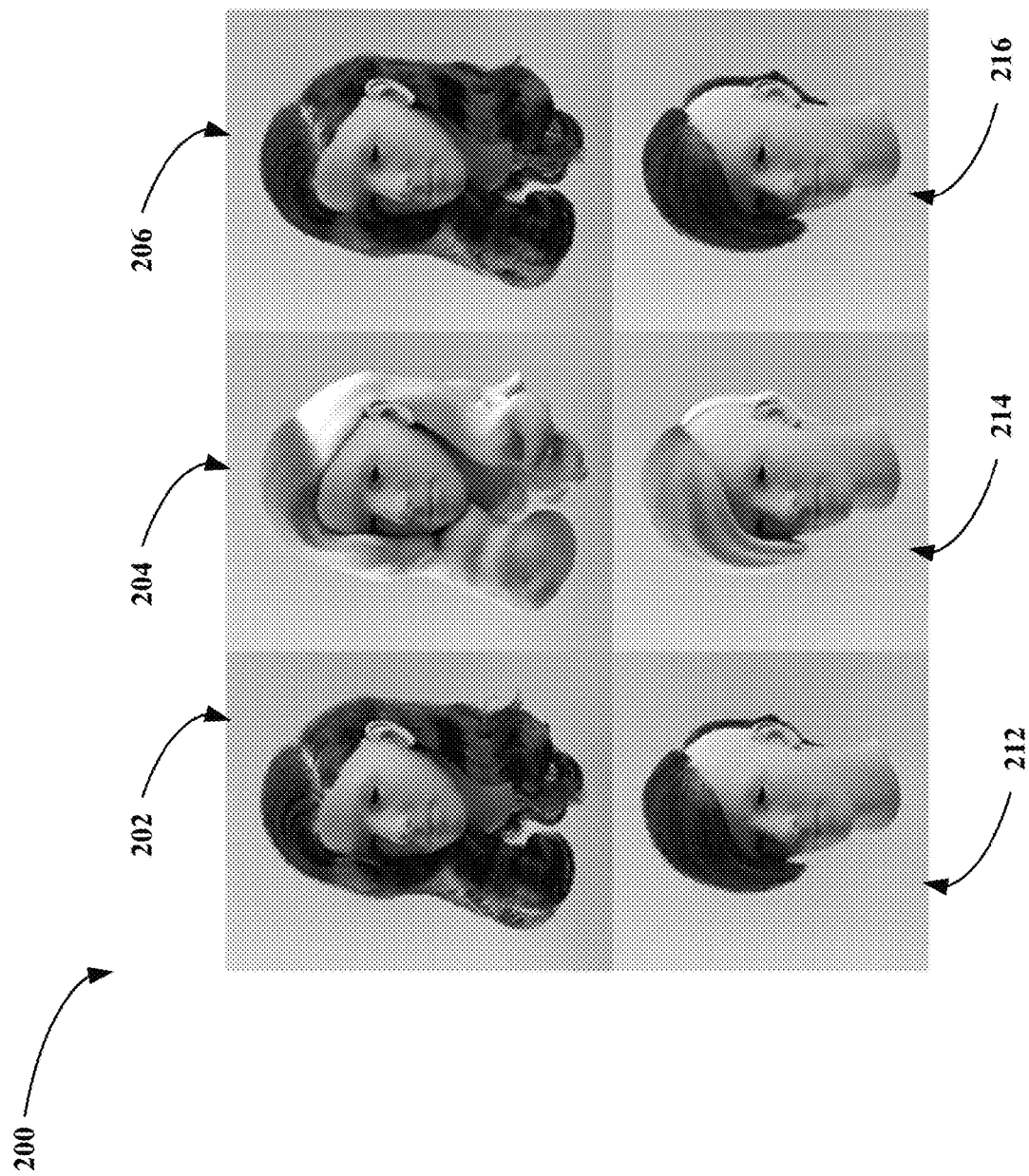
FIG. 2 is a diagram illustrating concrete examples of facial images including hair.

FIG. 2 is a diagram illustrating concrete examples 200 of facial images including hair. The examples 200 include original 3D hairstyles 202, 212 represented as strands. The examples 200 also include representations 204, 214 using occupancy and flow fields defined on regular grids in accordance with the systems and methods described herein. The representations 204, 214 using occupancy and flow fields defined on regular grids provide a visualization of the occupancy field boundary as a mesh surface. The mesh surface may encode the local flow value and surface color. Additionally, the example 200 includes regrown strands 206, 216 of hair that may be regrown within a computer model using the systems and methods described herein.

With the availability of Internet pictures and the ease of taking selfies, single-view hair modeling solutions may be becoming increasingly important within the context of consumer-friendly 3D avatar digitization. Single-view hair modeling techniques have been introduced for portrait manipulation purposes. The early geometric optimization methods may be designed for reconstructing front-facing subjects. The early geometric optimization methods may have difficulty approximating the geometry of the back of the hair, however.

An example proposes a data-driven method to produce entire hairstyles from a single input photograph and some user interactions. Some methods assemble different hairstyles from a 3D hairstyle database developed for the purpose of shape reconstruction. An example presents a fully automated variant using an augmented 3D hairstyle database and a deep convolutional neural network to segment hair regions. The example further improves the retrieval performance by introducing a deep learning-based hair attribute classifier, that increases the robustness for challenging input images from which local orientation fields may be difficult to extract. However, these data-driven methods rely on the quality and diversity of the database, as well as a successful pre-processing and analysis of the input image. In particular, when a 3D hair model with an identifiable likeness is not available in the database, the reconstructed hair model may be likely to fail. Furthermore, handcrafted descriptors become difficult to optimize as the diversity or number of hair models increases. The example presents a method for single-view hair modeling by directly inferring 3D strands from a 2D orientation field of a segmented hair region.

For shape space embedding, an example may embed a high-dimensional shape space into a compact subspace. Shape space embedding has been widely investigated for the shape modeling of human bodies and faces. Because different subjects may be anatomically compatible, it may be relatively easy to present them into a continuous low-dimensional subspace. However, it may not be straightforward to apply the embedding techniques to hairstyles due to the embedding technique's complex volumetric and topological structures, and the difficulty of annotating correspondences between hairstyles.

For 3D deep learning, the recent success of deep neural networks for tasks such as classification and regression may be explained in part by the deep neural network's effectiveness in converting data into a high-dimensional feature representation. Because convolutional neural networks may be designed to process images, 3D shapes may often be converted into regular grid representations to enable convolutions. Multi-view convolutional neural networks (CNNs) render 3D point clouds or meshes into depth maps and then apply 2D convolutions to them. Volumetric CNNs apply 3D convolutions directly onto the voxels, which may be converted from a 3D mesh or point cloud. One example may present a unified architecture that may directly take point clouds as input. Another example applies 3D CNNs to a variational autoencoder to embed 3D volumetric objects into a compact subspace. The methods may be limited to very low resolutions (e.g., 32×32×32) and focus on man-made shapes, while an example goal may be to encode high-resolution (128×192×128) 3D orientation fields as well as volumes of hairstyles. An example may infer a 3D face shape in the image space via direct volumetric regression from a single-view input while a volumetric representation may be embedded in an example hairstyle representation that may use a 3D direction field in addition to an occupancy grid. Furthermore, the embedding may be learned in a canonical space with fixed head size and position, which may allow for the handling of cropped images, as well as head models in arbitrary positions and orientations.

Figure 3:
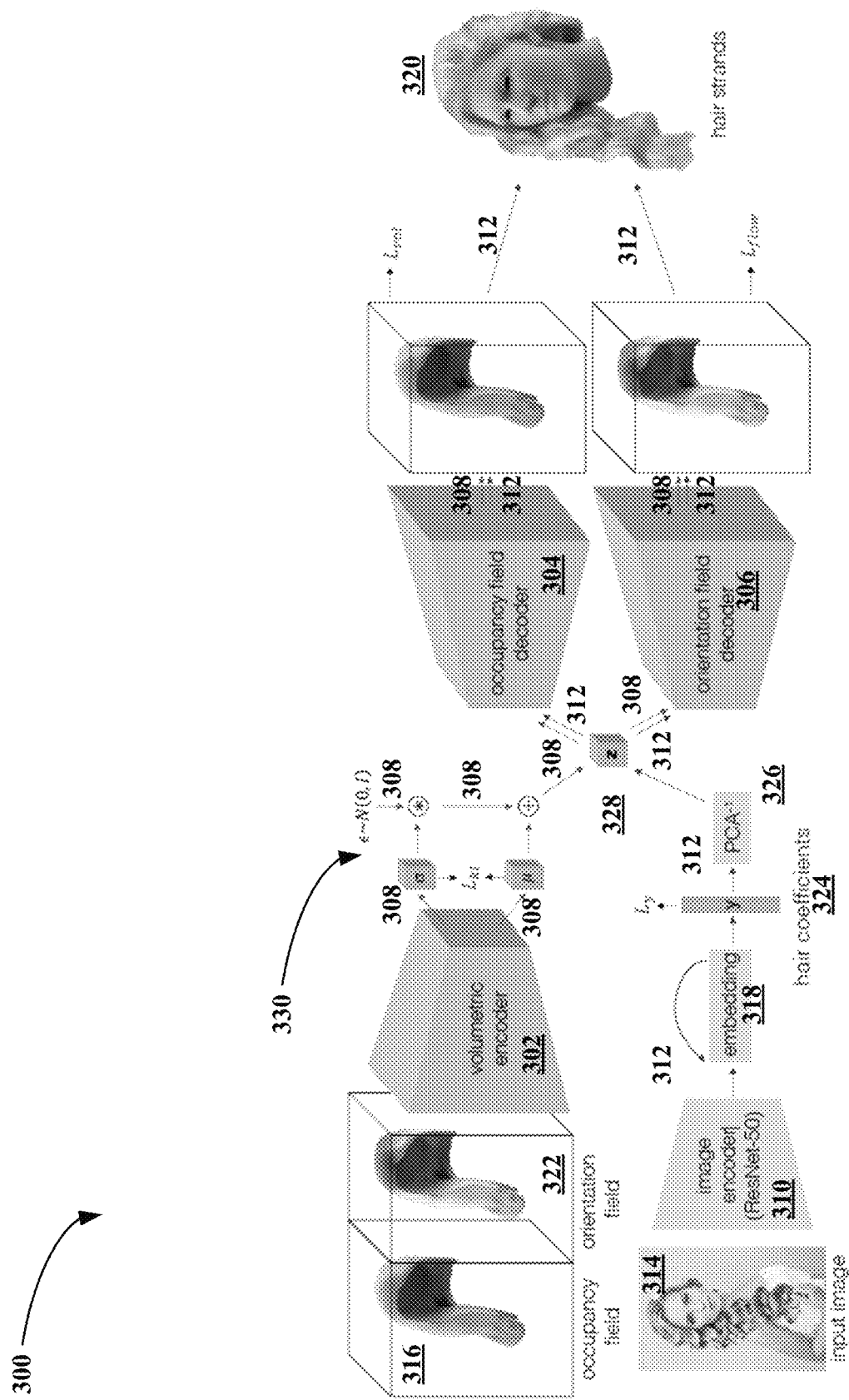
FIG. 3 is a diagram illustrating an example pipeline using an algorithm for single-view 3D hair modeling.

FIG. 3 is a diagram illustrating an example pipeline 300 using an algorithm for single-view 3D hair modeling. An example volumetric VAE may include an encoder 302 and two decoders 304, 306 with arrows 308 representing the related dataflow. Various mathematical functions 330 may be performed on outputs of the volumetric encoder 302 as illustrated in FIG. 3 and as described in the Equations 1-11. An example hair embedding network 310 follows the arrows 312 to synthesize hair strands 320 from an input image 314. An example hair data representation using a volumetric occupancy field 316 and a flow field and/or orientation field 322 is described. In one example, using a dataset of more than 2,000 different 3D hairstyles, a volumetric variational autoencoder may be trained to obtain a compact latent space, which encodes the immerse space of plausible 3D hairstyles. (It will be understood that datasets of more 3D hair styles or fewer 3D hairstyles may be used in some examples.) To enable end-to-end single-view 3D hairstyle modeling, an additional embedding network 318 may be trained to help predict the volumetric representation from an input image 314. Processing may be performed through the hair coefficient block 324 and the $PCA^{-1}$ block 326 to latent code z 328. Processing is described in greater detail below, including the various functions of Equations 1-11. Finally, hair strands 320 may be synthesized by growing (e.g., within a computer model) them from the scalp of a head model based on the predicted volume. If a face can be detected or manually fitted from the input image, optionally the output strands 320 may be refined to better match the single-view input.

In an example embodiment, a hair data representation may be constrained by two factors. First, the data representation itself needs to be easily handled by neural networks for training and inference algorithms. Second, an example representation should be compatible with traditional strand-based representations for high-fidelity modeling and rendering. To achieve these two goals, hair strands may be converted into a representation of two components, e.g., a 3D occupancy field and a corresponding flow field. In an example, the 3D occupancy field and the corresponding flow field may both be defined on uniformly sampled grids. In one example, the grids may be of resolution 128×192×128, although other resolutions are possible. In one example embodiment, a large resolution may be used along the y-axis (vertical direction) to better accommodate longer hairstyles.

Specifically, given a hairstyle of 3D strands, an occupancy field O may be generated using the outer surface extraction method. In one example, each grid of O may have a value of 1 when the grid center is inside the hair volume. Conversely, each grid of O may have a value of 0 when the grid center is not inside the hair volume. A 3D flow field F may be generated from the 3D hair strands. First, the local 3D orientation for those grids inside the hair volume may be computed by averaging the orientations of nearby strands. Then, the flow field may be smoothly diffused into the entire hair volume. Conversely, given an occupancy field O and the corresponding flow field F, 3D strands may be regenerated by growing from hair roots on a fixed scalp. The hair strands may be grown following the local orientation of the flow field F until hitting the surface boundary defined by the volume O.

In one example embodiment, a volumetric variational autoencoder 302 may be used. For example, in one example embodiment, a variational autoencoder (VAE) may be used. A VAE may be used with generative models. An example VAE includes an encoder $\varepsilon_\theta(x)$ and a decoder $\mathcal{D}_\phi(z)$. The encoder $\varepsilon_\theta$ encodes an input x into a latent code z, and the decoder $\mathcal{D}_\phi$ generates an output x' from a latent code z. The parameters θ and φ of the encoder and the decoder may be jointly trained so that the reconstruction error between x and x' may be minimized. While a "vanilla" or generic autoencoder uses a deterministic function for the encoder $\varepsilon_\theta(x)$, a variational autoencoder (VAE) may approximate $\varepsilon_\theta(x)$ as a posterior distribution q(z|x). The approximation may allow for the generation of new data x' by sampling z from a prior distribution. The encoding and decoding parameters θ and φ may be trained using a stochastic gradient variational Bayes (SGVB) algorithm as follows:

$$\theta^*, \phi^* = \underset{\theta,\phi}{\operatorname{argmin}} \mathbb{E}_{z \sim \varepsilon_\theta(x)}[-\log p(x|z)] + D_{kl}(\varepsilon_\theta(x) | p(z)), \quad (1)$$

where $D_{kl}$ denotes the Kullback-Leibler divergence. Assuming a multivariate Gaussian distribution $\varepsilon_\theta(x) \sim \mathcal{N}(z_\mu, \operatorname{diag}(z_\sigma))$ as a posterior and a standard isotropic Gaussian prior $p(z) \sim \mathcal{N}(0,I)$, the Kullback-Leibler divergence $D_{kl}$ may be formulated as $$D_{kl}(\varepsilon_\theta(x) | \mathcal{N}(0, I)) = \frac{1}{2} \sum_i (1 + 2\log z_{\sigma,i} - z_{\mu,i}^2 - z_{\sigma,i}^2), \quad (2)$$

where $z_\sigma$, $z_\mu$, may be the multi-dimensional output of $\varepsilon_\theta(x)$, representing the mean and standard deviation, respectively, and $D_{kl}$ may be computed as summation over all the channels of $z_\sigma$ and $z_\mu$. To make all the operations differentiable for back propagation, the random variable z may be sampled from the distribution $\varepsilon_\theta(x)$ via reparameterization using equation (3), below.

$$z = z_\mu + \epsilon \odot z_\sigma, \odot \sim \mathcal{N}(0,I), \quad (3)$$

where ⊙ is an element-wise matrix multiplication operator.

TABLE 1

An example volumetric VAE architecture

| Net | Type | Kernel | Stride | Output |
|---|---|---|---|---|
| enc. | conv. | 4 × 4 | 2 × 2 | 64 × 96 × 64 × 4 |
| enc. | conv. | 4 × 4 | 2 × 2 | 32 × 48 × 32 × 8 |
| enc. | conv. | 4 × 4 | 2 × 2 | 16 × 24 × 16 × 16 |
| enc. | conv. | 4 × 4 | 2 × 2 | 8 × 12 × 8 × 32 |
| enc. | conv. | 4 × 4 | 2 × 2 | 4 × 6 × 4 × 64 |
| dec. | transconv. | 4 × 4 | 2 × 2 | 8 × 12 × 8 × 32 |
| dec. | transconv. | 4 × 4 | 2 × 2 | 16 × 24 × 16 × 16 |
| dec. | transconv. | 4 × 4 | 2 × 2 | 32 × 48 × 32 × 8 |
| dec. | transconv. | 4 × 4 | 2 × 2 | 64 × 96 × 64 × 4 |
| dec. | transconv. | 4 × 4 | 2 × 2 | 128 × 192 × 128 × {1, 3} |

In the example of Table 1, the last convolution layer in the encoder may be duplicated for μ and σ for reparameterization using equation (3). The decoders for occupancy field and orientation field may be the same architecture except the last channel size (1 and 3, respectively). The weights on the decoders may not be shared. All the convolutional layers may be followed by batch normalization and rectified linear unit (ReLU) activation except the last layer in both the encoder and the decoder.

To train the encoding and decoding parameters of a VAE using an example volumetric representation, a first number of portrait images. In one example, 816 portrait images of various hairstyles may be collected and used in a single-view hair modeling method, however, any number of portraits may be used to reconstruct 3D hair strands as an example dataset. For each portrait image, a number of strokes, e.g., 1 to 4 strokes, or more, may be manually drawn to model the global structure, and the local strand shapes may then be refined automatically. By adding hairstyles, such as, for example, the 343 hairstyles from the USC-HairSalon dataset, which may be found at http://www-scf.usc.edu/~liwenbu/SHM/database.html, 1,159 different 3D hairstyles have been collected in total. The data may be further augmented by flipping each hairstyle horizontally and obtain a dataset of 2,318 different hairstyles. The hair geometry may be normalized and aligned by fitting to a fixed head model. The entire dataset may be randomly split into a training set of 2,164 hairstyles and a test set of 154 hairstyles, for example. It will be understood that many different numbers of hairstyles may be present in a particular dataset, e.g., from 1 to 3,000 or more. It will also be understood that the hairstyles may be split a number of different ways. Generally, the number of training hair styles may be lower than the number of test hairstyles. However, this may not always be the case in some example embodiments.

Using the VAE architecture, from the volumetric representation of the collected 3D hairstyle dataset, an encoder-decoder network may be trained to obtain a compact model for the space of 3D hairstyles. The architecture of an example VAE model is illustrated in Table 1. An encoder may concatenate the occupancy field O and flow field F together as volumetric input of resolution 128×192×128 in one example embodiment, and encode the input into a volumetric latent space $z_\mu$, and $z_\sigma$ of resolution 4×6×4 in the example embodiment. Each voxel in the latent space has a feature vector of dimension 64 in the example embodiment. Then a latent code $z \in \mathbb{R}^{4 \times 6 \times 4 \times 64}$ from $z_\mu$ and $z_\sigma$ may be sampled using reparameterization. Reparameterization may be performed using equation (3). The latent code z may be used as input for two decoders. One of them generates a scalar field as a level-set representing the hair volume while the other may be used to generate the 3D flow field.

An example loss function to train the network weights includes reconstruction errors for an occupancy field and a flow field, as well as Kullback-Leibler (KL) divergence loss. Binary Cross-Entropy (BCE) loss may be used for the reconstruction of occupancy fields. The standard BCE loss is $$\mathcal{L}_{BCE} = -\frac{1}{|\mathcal{V}|} \sum_{i \in \mathcal{V}} \left[ O_i \log \hat{O}_i + (1 - O_i) \log(1 - \hat{O}_i) \right], \quad (4)$$

where v denotes the uniformly sampled grids, |v| may be the total number of grids, $O_i \in \{0,1\}$ may be the ground-truth occupancy field value at a voxel $v_i$, and $\hat{O}_i$ may be the value predicted by the network and may be in the range of [0, 1]. An example modifies the BCE loss by setting the range of target value as, for example, {−1, 2} to prevent the gradient vanishing problem when a neural network's weights receive updates proportional to the partial derivative of the error function with respect to the current weight in each iteration of training. The gradient vanishing problem is a problem in artificial neural network training with gradient-based learning methods and backpropagation. The gradient in some cases may be small enough to prevent the weight from further changing value, e.g., being decreased further. This may, in some cases, stop the neural network from further training.

An example that modifies the BCE loss by setting the range of target value as, for example, {−1, 2} to prevent the gradient vanishing problem is:

$$\mathcal{L}'_{BCE} = -\frac{1}{|\mathcal{V}|} \sum_{i \in \mathcal{V}} \left[ \gamma O_i \log \hat{O}_i + (1 - \gamma)(1 - O_i) \log(1 - \hat{O}_i) \right], \quad (5)$$

where γ may be a relative weight to penalize more on false negatives. Although the modified loss function above improves the overall reconstruction accuracy, the details around the hair volume boundary from a typical encoder-decoder network may be over-smoothed, which may change the hairstyle structure unnaturally (see FIG. 4). To address the over-smoothed issue, a boundary-aware weighting scheme may be introduced by changing the loss function into:

$$\mathcal{L}_{vol} = \quad (6)$$
$$-\frac{1}{n(\alpha - 1) + |\mathcal{V}|} \sum_{i \in \mathcal{V}} w_i \left[ \gamma O_i \log \hat{O}_i + (1 - \gamma)(1 - O_i) \log(1 - \hat{O}_i) \right],$$
$$w_i = \begin{cases} \alpha & \text{iff } v_i \in \mathcal{N}(B_t) \\ 1 & \text{otherwise} \end{cases}$$

where $w_i$ takes a constant weight α larger than 1 when the voxel $v_i$ belongs to the one-ring neighbor $\mathcal{N}(B_t)$ of any boundary voxel $B_t$ inside the ground-truth hair volume, and n may be the number of voxels $\{v_i \in \mathcal{N}(B_t)\}$. For a 3D orientation field, the L1 loss may be used because the L2 loss may be known to produce over smoothed prediction results:

$$\mathcal{L}_{flow} = \sum_{i \in \mathcal{V}} O_i \| f_i - \hat{f}_i \|_1 / \sum_{i \in \mathcal{V}} O_i, \quad (7)$$

where $f_i$ and $\hat{f}_i$ may be the ground-truth and predicted flow vectors at voxel $v_i$, respectively. An example KL-divergence loss may be defined as:

$$\mathcal{L}_{kl} = D_{kl}(q(z|O,f) | \mathcal{N}(0,I)). \quad (8)$$

where q is the Gaussian posterior $\varepsilon_\theta$ (O, f). Then an example total loss becomes:

$$\mathcal{L} = \mathcal{L}_{vol} + w_{flow} \mathcal{L}_{flow} + w_{kl} \mathcal{L}_{kl}. \quad (9)$$

where $w_{flow}$ and $w_{kl}$ may be relative weights for the orientation field reconstruction loss and the KL divergence loss, respectively.

In an example embodiment, for both the encoder and decoder networks, a kernel size of 4 may be used with a stride of 2 and a padding of 1 for the convolution operations. The convolutional layers may be followed by batch normalization and ReLU activation except for the last layer in both networks. The sigmoid function and the tanh function may be used as the nonlinear activations for the occupancy and flow fields, respectively. In an example, the training parameters may be fixed to be γ=0.97, α=50, $w_{flow}$=1.0 and $w_{kl}$=2×10$^{-5}$ based on cross validation. The loss function for 400 epochs may be minimized using an Adaptive Moment Estimation (Adam) solver. The Adam solver may combine an adaptive step size with momentum terms and has been reasonably robust to saddle points. The techniques may exhibit linear convergence, which means that the error decreases proportionally to the inverse of the number of training iterations. A batch size of 4 and learning rate of 1×10$^{-3}$ may be used in one example embodiment using the Adam solver.

In an example embodiment, to achieve end-to-end single-view 3D hair synthesis, an embedding network may be trained to predict the hair latent code z in the latent space from input images. The collected dataset of portrait photos and the corresponding 3D hairstyles may be used as training data.

TABLE 2

Evaluation of training loss functions
in terms of reconstruction accuracy

| Training Loss | IOU | Precision | Recall | L2 (flow) |
| --- | --- | --- | --- | --- |
| Example Embodiment (VAE) | 0.8243 | 0.8888 | 0.9191 | 0.2118 |
| Example Embodiment (AE) | 0.8135 | 0.8832 | 0.9116 | 0.2403 |
| [Brock et al. 2016] | 0.6879 | 0.8249 | 0.8056 | 0.2308 |
| Generic VAE | 0.5977 | 0.7672 | 0.7302 | 0.2341 |

Table 2 illustrates an evaluation of training loss functions in terms of reconstruction accuracy for occupancy fields (IOU, precision and recall) and flow field (L2 loss). The effectiveness of the proposed loss function may be evaluated by comparing the proposed loss function with (1) the proposed loss function without the KL-divergence loss term denoted as "Example Embodiment (AE)," (2) a state-of-the-art volumetric generative model using VAE [Brock et al. 2016], and (3) generic VAE. [Brock et al. 2016] refers to: Andrew Brock, Theodore Lim, James M. Ritchie, and Nick Weston, 2016, Generative and Discriminative Voxel Modeling with Convolution Neural Networks, in 3D *Deep Learning Workshop, Advances in neural information processing systems(NIPS)*, pp. 1-9.

TABLE 3

Evaluation of different embedding methods

| Embedding | IOU | Precision | Recall | L2 (flow) |
| --- | --- | --- | --- | --- |
| PCA | 0.8127 | 0.8797 | 0.9143 | 0.2170 |
| Single-vector VAE | 0.6278 | 0.7214 | 0.7907 | 0.2223 |
| Non-Linear | 0.6639 | 0.7784 | 0.8186 | 0.2637 |

Table 3 illustrates an evaluation of different embedding methods. The first row includes an example linear PCA embedding. The second row includes a single-vector VAE (in contrast to an example volumetric VAE). The third row includes a non-linear embedding with fully connected layers and ReLU activations. In one example, the dimensions of latent space may be 512 for the three methods.

Because example training data may be limited, it may be desirable to reduce the number of unknowns to be predicted for more robust training of the embedding. An example may assume that the latent space of 3D hairstyles may be well-approximated in a low-rank linear space. Based on the assumption, the PCA embedding of the volumetric latent space may be computed and 512-dimensional PCA coefficients y may be used as a compact feature representation of the feasible space of 3D hairstyles. Then the goal of the embedding task may be to match predicted hair coefficients $\hat{y}$ to the ground-truth coefficients y by minimizing the following L2 loss:

$$\mathcal{L}_y = \|y - \hat{y}\|_2. \quad (10)$$

Note that $z_\mu$ may be used instead of stochastically sampled latent code $z \sim \mathcal{N}(z_\mu, z_\sigma)$ to eliminate randomness in the embedding process. An example hair embedding pipeline is illustrated in FIG. 3 (bottom part).

An example embodiment may use a ResNet-50 model pretrained on ImageNet and fine tune the model as an image encoder. Average pooling may be applied in the last convolution layer and the output vector may be taken as an image feature vector $I \in \mathbb{R}^{2048}$. The process of Iterative Error Feedback (IEF) may be applied to train an example hair embedding network. The embedding network $\mathcal{P}$ may take the image feature vector I together with the current hair coefficients $y_t$ as input and predict the updated coefficients $y_{t+1}$ as illustrated below:

$$\hat{y}_{t+1} = \hat{y}_t + \mathcal{P}(I, \hat{y}_t). \quad (11)$$

IEF may have better generalization performance compared to direct embedding in a single shot, which usually overfits the ground-truth training data. Three iterations of IEF may be run because no further performance improvement is observed afterwards.

In an example embodiment, a hair embedding network may include two 1024-dimensional fully connected layers with ReLU and dropout layers in-between, followed by an output layer with 512 neurons. The learning rate may be set to $10^{-5}$ and $10^{-4}$ for the image encoder and the hair embedding network, respectively. The network may be trained with 1,000 epochs using the Adam solver on an example collected hairstyle dataset as described herein. A batch size of 16 and learning rate of $1 \times 10^{-4}$ may be used. To make an example embedding network more robust against input variations, an example image dataset may be augmented by applying different random image manipulations, including Gaussian noise (e.g., of standard deviation 0.15), Gaussian blur (e.g., of standard deviation 0.15), rotation (e.g., maximum 20 degrees), scaling (e.g., within the range of [0.5, 1.5]), occlusion (e.g., maximum 40% with random color) and color jittering (e.g., brightness, contrast, hue and saturation).

Unlike most VAE based approaches, which reshape the encoding result into one long vector and apply fully connected layers to further reduce dimension, a volumetric latent space may be used to preserve the spatial dimensions. Reshaping into a one-dimensional vector may limit the expressiveness of the network significantly because it may be difficult to fully cover hair local variation in the training process. An example illustrates that PCA may be the optimal solution for low-rank approximation in linear cases. A non-linear embedding using multilayer perceptron (MLP) may be used in an example. Although MLP should be more general than PCA with MLP's nonlinear layers, it has been found that using MLP may overfit an example training data and lead to larger generalization errors on the test set.

After the hair volume is predicted with local orientations using an example hair embedding and decoding network, hair strands may be virtually synthesized by growing them from the virtual scalp, following the orientation inside the hair volume. Because the 3D hair geometry is represented in a normalized model space, the synthesized strands may not align with the head pose in the input image. If the head pose is available (e.g., via manual fitting or face landmark detection) and the segmentation, orientation, or both may be estimated reliably from the input image, then, optionally several post-processing steps may be applied to further improve the modeling results, following some prior methods with similar data representation. Starting from the input image, the pixel-level hair mask and digitized head model may be segmented. Then a spatial deformation step may be run to fit an example hairstyle to the personalized head model. The mask-based deformation method may be applied to improve alignment with the hair segmentation mask. The 2D orientation deformation and the depth estimation method may be adopted to match the local details of synthesized strands to the 2D orientation map from the input image.

Figure 4:
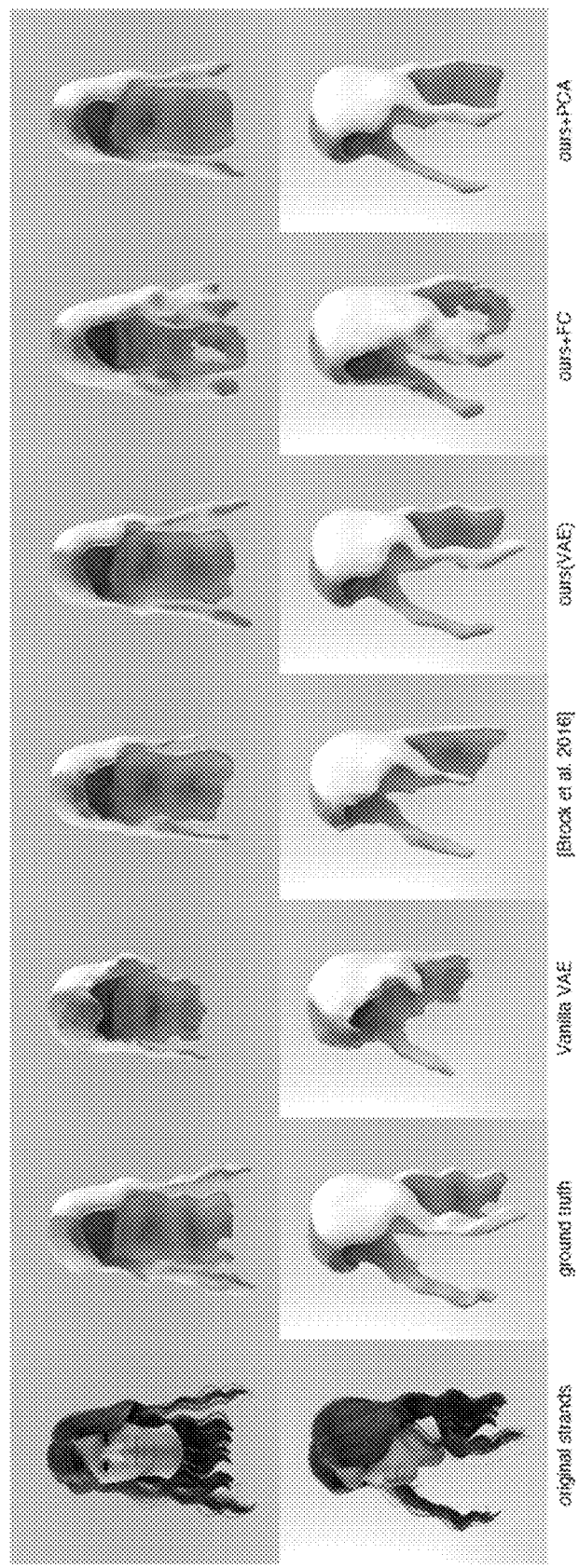
FIG. 4 is a diagram illustrating an example using a modified loss function that may improve the overall reconstruction accuracy but may over-smooth the details around the hair volume boundary from a typical encoder-decoder network, which may change the hairstyle structure unnaturally.

FIG. 4 is a diagram illustrating an example series of pictures 400 using a modified loss function that may improve the overall reconstruction accuracy but may oversmooth the details around the hair volume boundary from a typical encoder-decoder network, which may change the hairstyle structure unnaturally. A comparison of different training schemes is illustrated, including example original strands, a ground-truth volumetric representation, the reconstruction results using vanilla VAE, a volumetric VAE, and the systems and methods described herein VAE, and the systems and methods described herein VAE with PCA embedding, respectively.

Design options of several algorithm components may be evaluated by comparing an example method with alternative approaches. For example, an ablation study may be run on the proposed loss function in Equation (6) by comparing Equation (6) with three other functions: a non-variational autoencoder with an example reconstruction loss function, a state-of-the-art volumetric generative model using VAE, and generic VAE. Generic VAE may be referred to as a VAE trained using naive Binary Cross-Entropy loss for occupancy fields, with the rest remaining the same. For a fair comparison, the same architecture and the same parameters may be used, with the exception of the loss function used for training. Table 2 illustrates that an example proposed loss function may achieve the greatest intersection of union (IOU), the greatest precision and recall for reconstruction of an occupancy field, and the smallest error for reconstruction of a flow field. FIG. 4 demonstrates that an example reconstruction results match the ground-truth data closely, whereas alternative approaches lead to over-smoothed output. Although the same flow term defined in Equation (7) may be used for all the comparisons in Table 2, an example training scheme may achieve superior reconstruction accuracy for a flow field as well.

TABLE 4

Evaluation of prediction methods

| Method | IOU | Precision | Recall | L2 (flow) |
|---|---|---|---|---|
| IEF | 0.6487 | 0.8187 | 0.7565 | 0.1879 |
| Direct prediction | 0.6346 | 0.8063 | 0.7374 | 0.2080 |
| End-to-end | 0.4914 | 0.5301 | 0.8630 | 0.3844 |

Table 4 is an evaluation of prediction methods. An example embedding method based on Iterative Error Feedback (IEF) may be compared with direct prediction in a single shot for hair coefficients and end-to-end training where the network directly predicts the volumetric representation given an input image. An example PCA embedding may be compared to a non-linear embedding with fully connected layers, which may commonly be used for convolutional variational training. For a fully connected VAE with a latent space of resolution 4×6×4×64, the output of an example encoder may be reshaped into a long vector and may be passed to a multilayer perceptron (MLP). The dimension of each layer of the MLP may be 1024, 512, 1024 and 6144, respectively, in one example embodiment. Each layer may be followed by batch normalization and ReLU activation, except the layer with 512 neurons for variational training. The output of the MLP may be connected to the first layer of the decoder by reshaping the output of the MLP back into 4×6×4×64. Table 3 illustrates that PCA embedding achieves significantly better reconstruction accuracy compared to a non-linear embedding VAE with fully connected layers and ReLU activations (the second row in Table 3). An example linear PCA embedding may be compared to non-linear embedding, using the same MLP architecture as above. The MLP may be trained to obtain a low-dimensional embedding by minimizing the L2 reconstruction loss of the volumetric latent variables from the proposed volumetric VAE on the dataset used in the PCA embedding. Due to an example limited number of training data, poor generalizations have been observed in the test set (the third row in Table 3). Additionally, compared to an example VAE model (the first row in Table 2), an example PCA embedding (the first row in Table 3) has led to very little increase in reconstruction errors. This observation validates an example low-rank assumption of the hair latent space.

An example embedding network using IEF may be compared with two alternative approaches. The first method directly predicts parameters in a single shot and the second one, end-to-end training, directly predicts the volumetric representation given an input image. The numbers in Table 4 illustrate that compared to direct prediction, an example IEF-based embedding network achieves better performance in terms of IOU, precision and the recall for occupancy field, as well as lower L2 error for the prediction of the flow field. Moreover, end-to-end training has substantially worse reconstruction accuracy for both the occupancy field and the flow field. These comparison results illustrate that an example two-step approach improves the stability of the training process by separately learning the generative model and the embedding network.

Figure 5:
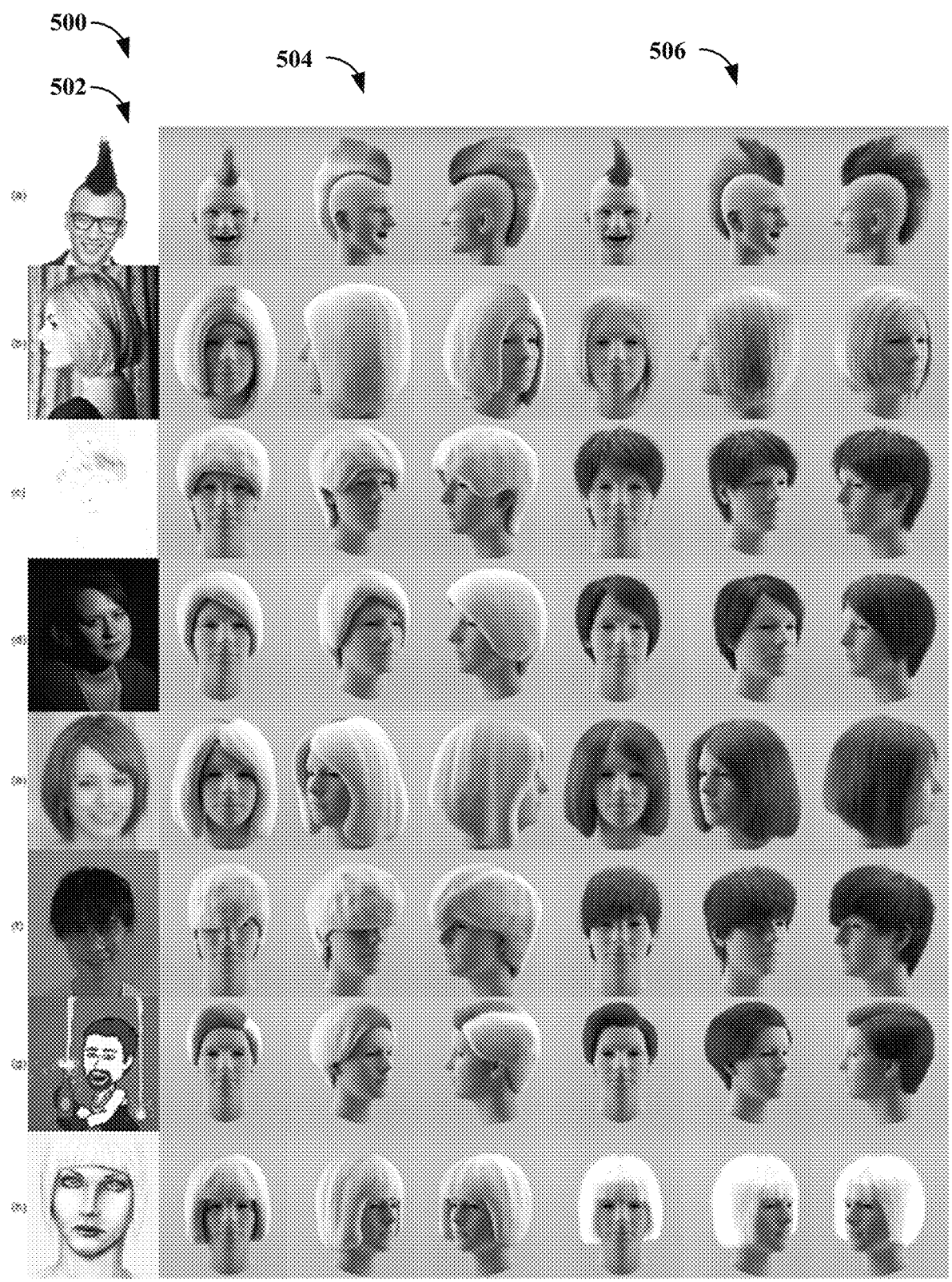
FIG. 5 is a diagram illustrating multiple example facial images including hair.

FIG. 5 is a diagram illustrating multiple example facial images including hair 500. The modeling results of 3D hairstyle from a single input image include the input images 502, the occupancy field 504 with color-coded local orientations predicted by the single-view hair modeling pipeline described herein, as well as the synthesized strands 506. None of the images of FIG. 5 have been used for training of the embedded network.

In an example embodiment, a single-view 3D hairstyle modeling result from a variety of input images is illustrated in FIGS. 1 and 5. For each image, the predicted occupancy field 504 with color-coded local orientation as well as synthesized strands 506 with manually specified color is illustrated. Note that none of these test images may be used to train an example hair embedding network. An example method may be end-to-end and does not require any user interactions such as manually fitting a head model and drawing guiding strokes. Moreover, several input images in FIG. 5 may be particularly challenging, because they may be either over-exposed (e.g., the third row), have low contrast between the hair and the background (e.g., the fourth row), have low resolution (e.g., the fifth row and the sixth row), or are illustrated in a cartoon style (e.g., the last two rows). Although an example training dataset for the hair embedding network only includes examples modeled from normal headshot photographs without any extreme cases (e.g., poorly illuminated images or pictures of dogs), an example method generalizes very well due to the robustness of deep image features. A typical face detector may fail to detect a human face from the third, the fifth and the sixth input images in FIG. 5, which may prevent existing automatic hair modeling methods from generating any meaningful results. In FIG. 5, only the first image can be handled by some systems because the algorithm of such systems requires both successful face detection and high-quality hair segmentation.

Figure 6:
FIG. 6 is a diagram illustrating a comparison of various methods including the methods described herein.

FIG. 6 is a diagram illustrating a comparison 600 of various methods including the methods described herein. The comparison between the systems and methods described herein and "AutoHair" includes an input image, the result from AutoHair, the volumetric output of the VAE network of the systems and methods described herein, and the final strands. The systems and methods described herein may achieve comparable results on input images of typical hair styles FIGS. 6(a)-6(f) and 6(l) and may generate results closer to the modeling target on more challenging examples FIGS. 6(g)-6(k). The inset images of FIGS. 6(g) and 6(h) illustrate segmentation masks generated by AutoHair.

In FIG. 6, an example method is compared to an automatic single-view hair modeling technique on a variety of input images. An example results may be comparable to those by some other systems on those less challenging inputs of typical hairstyles (FIGS. 6(a)-(f) and 6(l)). For these challenging cases (FIGS. 6(g)-(k)), a more faithful modeling output may be generated, because some methods rely on accurate hair segmentation which may be difficult to achieve with partial occlusions or less typical hairstyles.

Figure 7:
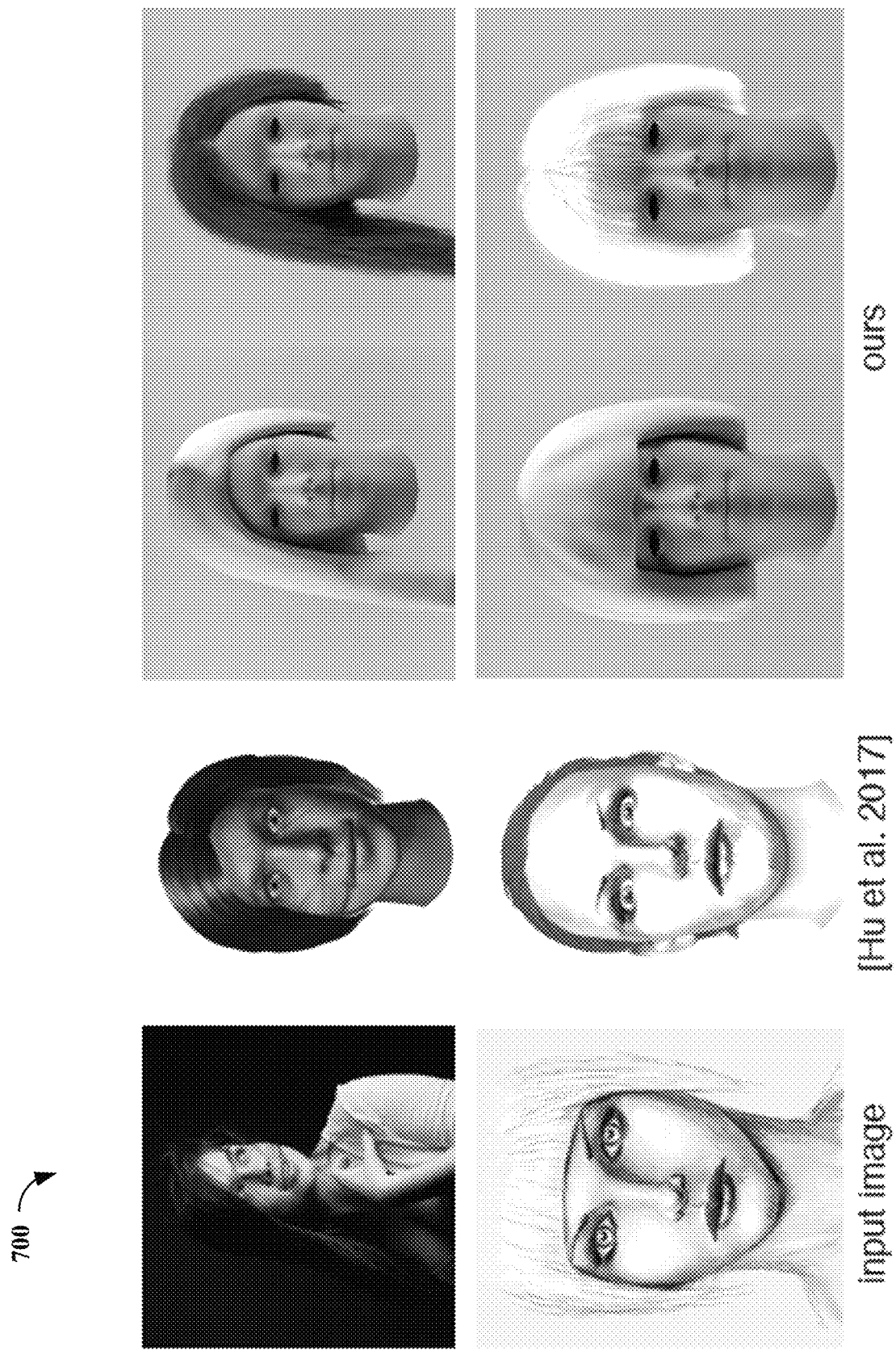
FIG. 7 is a diagram illustrating comparisons of various methods including the methods described herein and an automatic avatar digitization method.

FIG. 7 is a diagram illustrating comparisons 700 of various methods including the methods described herein and an automatic avatar digitization method. Comparisons between the systems and methods described herein and other avatar digitization methods using the same input images are illustrated. Another comparison may compare an example method with another recent automatic avatar digitization method in FIG. 7. The automatic avatar digitization method hair attribute classifier may successfully identify the long hairstyle for the first image but may fail to retrieve a proper hairstyle from the database because the hair segmentation may not be accurate enough. For the second input image in FIG. 7, the automatic avatar digitization method may generate a less faithful result because the classifier cannot correctly identify the target hairstyle as "with fringe."

In example results, the post-processing step may be applied to the top-left example in FIG. 1, the first one in FIG. 5 and all those in FIG. 6. All the other results may be generated by growing strands directly from the fields predicted by an example network.

An example compact representation of latent space for 3D hairstyles may easily be applied to hair interpolation. Given multiple input hairstyles and the normalized weights for interpolation, first the corresponding hair coefficients of PCA embedding in the latent space may be computed for each hairstyle. Then the interpolated PCA coefficients may be obtained for the output by averaging the coefficients of input hairstyles based on the weights. Finally, the interpolated hairstyle may be generated via an example decoder network.

Figure 8:
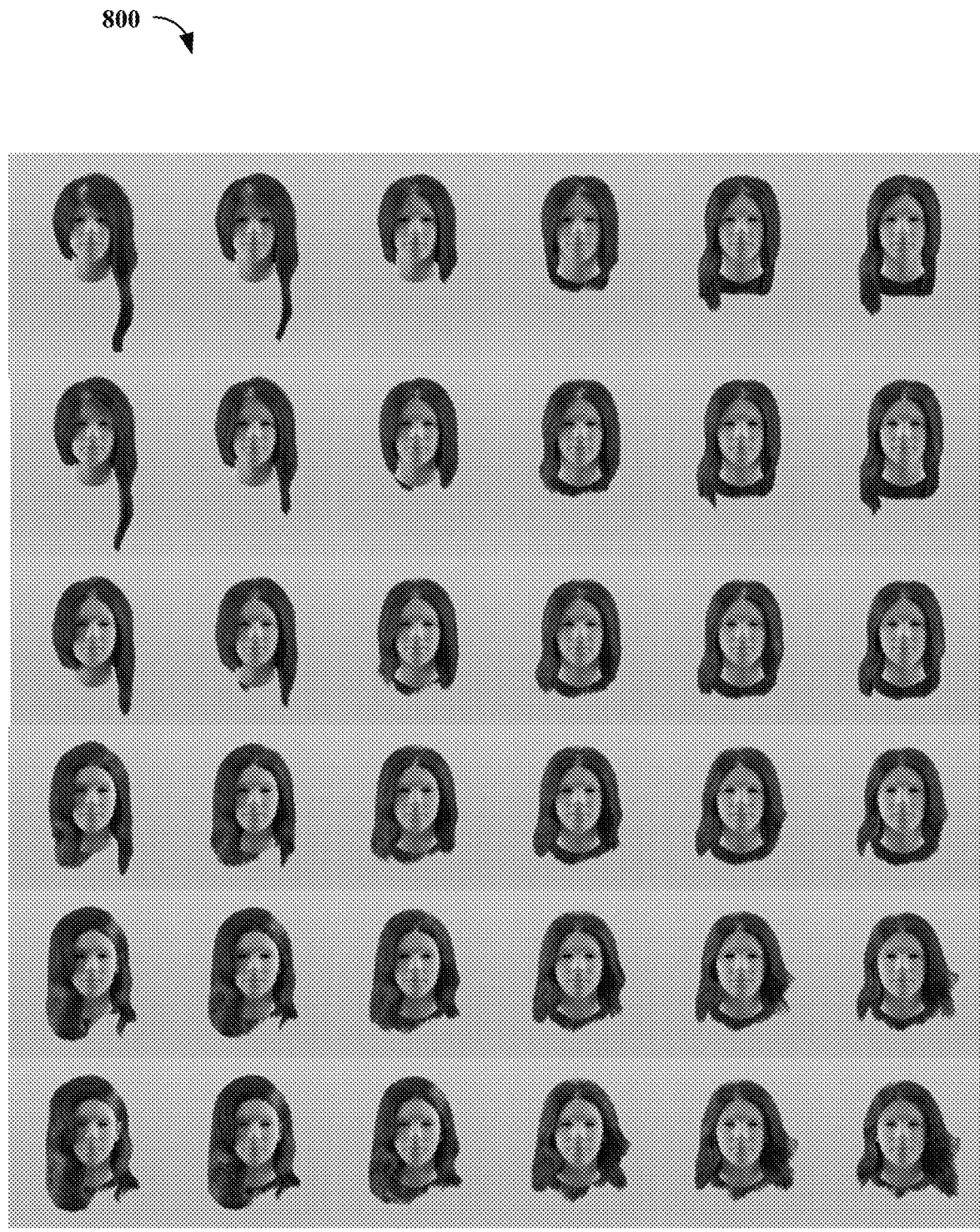
FIG. 8 is a diagram illustrating interpolation results of multiple hairstyles.

FIG. 8 is a diagram illustrating interpolation results of multiple hairstyles 800. Interpolation results of multiple hairstyles are illustrated. The four input hair styles are illustrated at the corner, while the interpolation results are illustrated in between, based on bi-linear interpolation weights.

Figure 9:
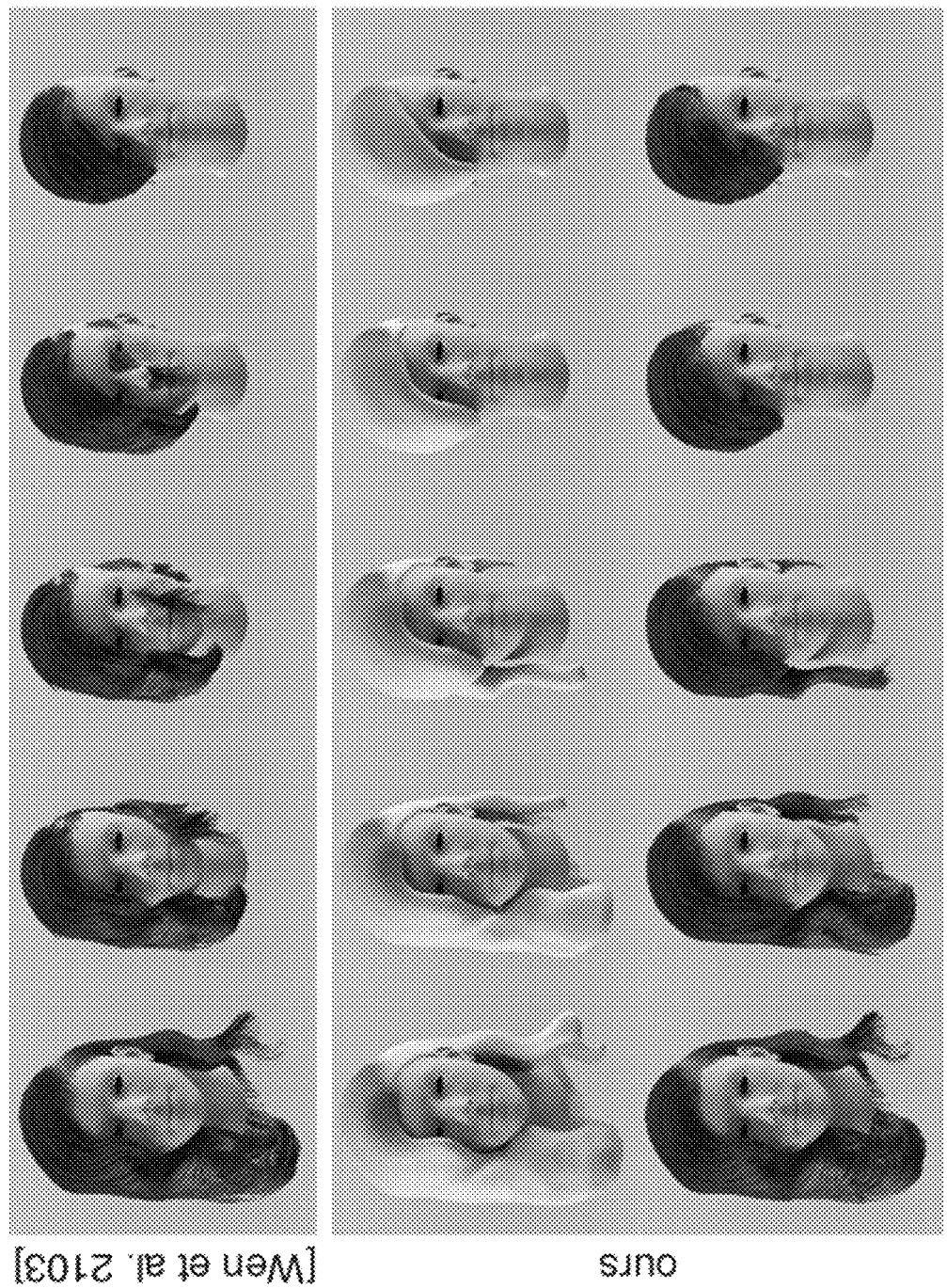
FIG. 9 is a diagram illustrating how a compact representation of hair latent space leads to much more plausible interpolation results from two example input hairstyles with drastically different structures.

FIG. 9 is a diagram illustrating how a compact representation of hair latent space 900 leads to much more plausible interpolation results from two example input hairstyles with drastically different structures. Comparison between direct interpolation of hair strands and latent space interpolation results.

An example hair model takes about 14 MB to store in main memory, including PCA embedding and weights of decoders for both occupancy and flow fields. The training of an example VAE model and hair embedding network takes about eight hours and one day, respectively, in an example. The prediction of PCA coefficients takes less than one second for an input image of resolution 256×256, while decoding into volumetric representation of occupancy and flow fields only takes about two milliseconds on an example GPU. The generation of final strands from occupancy and flow fields takes 0.7~1.7 seconds, depending on the strand lengths in an example. All the timing statistics may be measured on a single PC with an Intel Core i7 CPU, 64 GB of memory, and an NVIDIA GeForce GTX 1080 Ti graphics card in an example.

A fully automatic single-view 3D hair reconstruction method based on a deep learning framework that may be trained end-to-end using a combination of artistically created and synthetically digitized hair models has been presented. Convolutions may be made possible by converting 3D hair strands into a volumetric occupancy grid and a 3D orientation field. An example volumetric variational autoencoder may be highly effective in encoding the immense space of possible hairstyles into a compact feature embedding. Plausible hairstyles may be sampled and interpolated from the latent space of the VAE. The effectiveness of using a PCA embedding and iterative error feedback technique to improve the hairstyle embedding network for handling difficult input images has been illustrated. Compared to some data-driven techniques, an example approach may be significantly faster and more robust, as the example may not rely on successful image pre-processing, analysis, or database retrieval. In addition to an example ability to produce hairstyles that were not included in the training data, extremely challenging cases may be handled, such as inputs including occluded faces, poorly-lit subjects, and stylized pictures. Due to the proposed 3D hair synthesis framework potentially having minimal storage requirements and superior robustness compared to existing methods, an example 3D hair synthesis framework may be particularly well-suited for next generation avatar digitization solutions. While the application of 3D hair digitization is the focus, an example volumetric VAE-based synthesis algorithm may be extended to reconstruct a broad range of nontrivial shapes such as clothing, furry animals, facial hair, or other graphical constructs.

Figure 10:
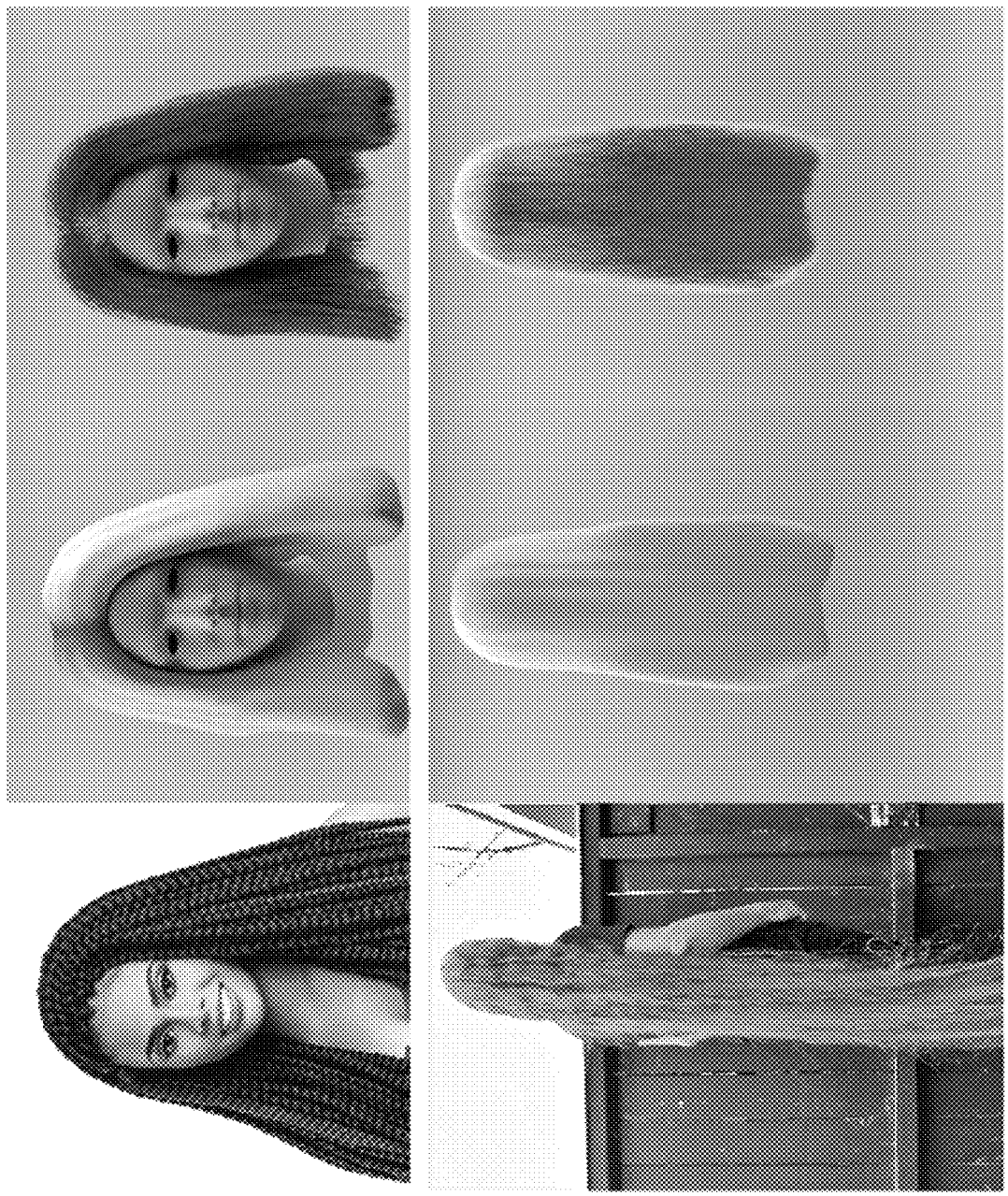
FIG. 10 illustrates two example failure cases of an example system.

FIG. 10 illustrates two failure cases 1000, 1002 of an example current system. As with using any grid-based volumetric representation, the demand of CPU memory imposes a considerable limitation in terms of hair geometry resolution and bounding volume. As a data-driven approach, the effectiveness of an example method is also determined by the available training data. Example modeling results may be biased towards examples in the dataset which may be close to but different from the target hairstyles. Furthermore, while the latent space of an example volumetric VAE may compactly describe the space of feasible hairstyles, there may be no semantic meaning associated with each sample. For many graphics applications, it may be advantageous to provide high-level controls to a user for intuitive analysis and manipulation.

As an example, hair synthesis algorithms may currently be limited to strand-based hairstyles, it may be worth exploring more generalized representations that may also handle very short hair, Afro hairstyles, or even more rendering efficient polystrip models. Ways to provide semantic controls for intuitive hairstyle modeling, such as learning a manifold of a hairstyle space, may be explored. Another interesting direction may be to investigate methods of inference for high-frequency details of a greater variety of hair structures, such as those found in curly and voluminous hairstyles.

Figure 11:
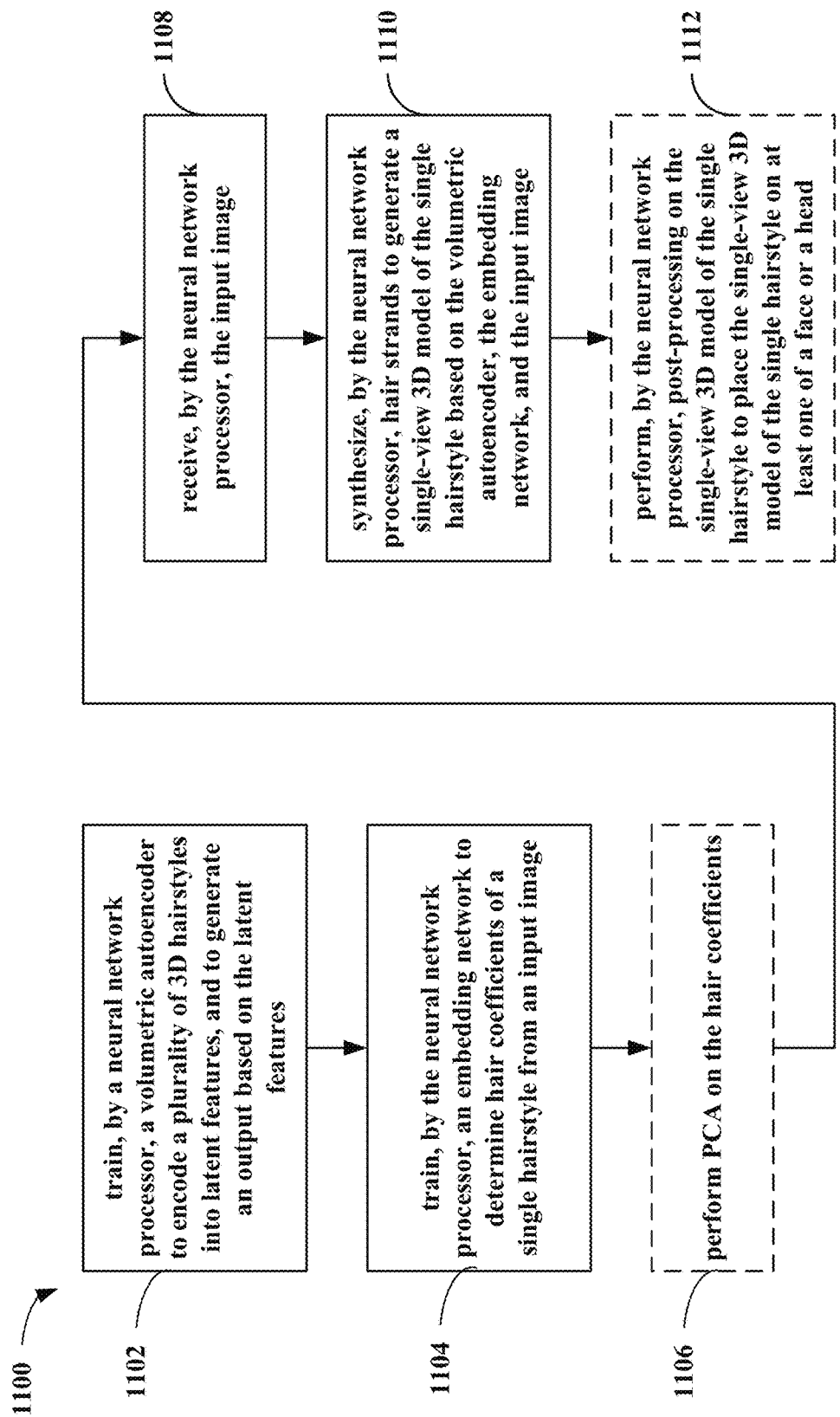
FIG. 11 is a flowchart illustrating an example method in accordance with an embodiment described herein.

FIG. 11 is a flowchart illustrating an example method 1100 in accordance with an embodiment described herein. In an example, the method 1100 may be implemented as a neural network processor. For example, instructions implementing the method may be stored in a memory coupled to the neural network processor. The neural network processor may execute the instructions to implement the method 1100.

The method includes training, by a neural network processor, a volumetric autoencoder to encode a plurality of 3D hairstyles into latent features, and to generate an output based on the latent features (1102), training, by the neural network processor, an embedding network to determine hair coefficients of a single hairstyle from an input image (1104), receiving, by the neural network processor, the input image (1108), and synthesizing, by the neural network processor, hair strands to generate a single-view 3D model of the single hairstyle based on the volumetric autoencoder, the embedding network, and the input image (1110).

Optionally, the method 1100 may include performing Principled Component Analysis (PCA) on the hair coefficients (1106) and performing, by the neural network processor, post-processing on the single-view 3D model of the single hairstyle to place the single-view 3D model of the single hairstyle on at least one of a face or a head (1112).

As discussed above, the method includes training, by a neural network processor, a volumetric autoencoder to encode a plurality of 3D hairstyles into latent features, and to generate an output based on the latent features (1102). In an example embodiment, training the volumetric autoencoder may include training the volumetric autoencoder to encode the plurality of 3D hairstyles by representing the plurality of 3D hairstyles using an occupancy field representing a volume of a specific hairstyle and a flow field representing an orientation of hair strands of the specific hairstyle. Additionally, the flow field is determined by averaging orientations of nearby strands and diffusing the flow field into the volume represented by the occupancy field.

In an example embodiment, training the volumetric autoencoder includes training the volumetric autoencoder to include a volumetric encoder to encode the plurality of 3D hairstyles into the latent features and an occupancy field decoder to decode an occupancy field representing a volume of the single hairstyle and an orientation field decoder to decode a flow field representing an orientation of hair strands of the single hairstyle to generate the output.

In an example embodiment, post-processing may include segmenting a pixel-level hair mask and a digitized head model starting from an input image and applying a mask-based deformation method to improve alignment with the hair segmentation mask.

In describing the present invention, the following terminology will be used: The singular forms "a," "an," and "the" include plural references unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" means quantities, dimensions, sizes, formulations, parameters, shapes, and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including, for example, tolerances, measurement error, measurement accuracy limitations and other factors known to those of skill in the art, may occur in amounts that do not preclude the effect the characteristic was intended to provide. Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but also include individual values and sub-ranges within the indicated range. Thus, included in this numerical range are individual values such as 2, 3 and 4 and sub-ranges such as 1-3, 2-4 and 3-5, etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

It should be appreciated that the particular implementations shown and described herein are illustrative of the invention and its best mode and are not intended to otherwise limit the scope of the present invention in any way. Furthermore, the connecting lines shown in the various figures contained herein are intended to represent exemplary functional relationships and/or physical couplings between the various elements. It should be noted that many alternative or additional functional relationships or physical connections may be present in a practical device.

As one skilled in the art will appreciate, the mechanism of the present invention may be suitably configured in any of several ways. It should be understood that the mechanism described herein with reference to the figures is but one exemplary embodiment of the invention and is not intended to limit the scope of the invention as described above.

It should be understood, however, that the detailed description and specific examples, while indicating exemplary embodiments of the present invention, are given for purposes of illustration only and not of limitation. Many changes and modifications within the scope of the instant invention may be made without departing from the spirit thereof, and the invention includes all such modifications. The corresponding structures, materials, acts, and equivalents of all elements in the claims below are intended to include any structure, material, or acts for performing the functions in combination with other claimed elements as specifically claimed. The scope of the invention should be determined by the appended claims and their legal equivalents, rather than by the examples given above. For example, the operations recited in any method claims may be executed in any order and are not limited to the order presented in the claims. Moreover, no element is essential to the practice of the invention unless specifically described herein as "critical" or "essential."

What is claimed is:

1. A method for single-view 3D hair modeling, the method comprising:
    training, by a neural network processor, a volumetric autoencoder to encode a plurality of 3D hairstyles into latent features by representing the plurality of 3D hairstyles using an occupancy field representing a volume of a specific hairstyle and a flow field representing an orientation of hair strands of the specific hairstyle, and to generate an output based on the latent features;
    training, by the neural network processor, an embedding network to determine hair coefficients of a single hairstyle from an input image;
    receiving, by the neural network processor, the input image; and
    synthesizing, by the neural network processor, hair strands to generate a single-view 3D model of the single hairstyle based on the volumetric autoencoder, the embedding network, and the input image.

2. The method of claim 1, wherein the flow field is determined by averaging orientations of nearby strands and diffusing the flow field into the volume represented by the occupancy field.

3. The method of claim 1, wherein training the volumetric autoencoder includes training the volumetric autoencoder to include a volumetric encoder to encode the plurality of 3D hairstyles into the latent features and an occupancy field decoder to decode the occupancy field representing the volume of the single hairstyle and an orientation field decoder to decode the flow field representing the orientation of hair strands of the single hairstyle to generate the output.

4. The method of claim 1, further comprising performing Principled Component Analysis (PCA) on the hair coefficients.

5. The method of claim 1, further comprising performing, by the neural network processor, post-processing on the single-view 3D model of the single hairstyle to place the single-view 3D model of the single hairstyle on at least one of a face or a head.

6. The method of claim 5, wherein the post-processing includes:
    segmenting a pixel-level hair mask and a digitized head model starting from the input image; and
    applying a mask-based deformation method to improve alignment with the hair mask.

7. A device for single-view 3D hair modeling, the device comprising:
    a neural network processor; and
    a memory, coupled to the neural network processor, the memory including instructions causing the neural network processor to:
        train a volumetric autoencoder to encode a plurality of 3D hairstyles into latent features by representing the plurality of 3D hairstyles using an occupancy field representing a volume of a specific hairstyle and a flow field representing an orientation of hair strands of the specific hairstyle, and to generate an output based on the latent features;
        train an embedding network to determine hair coefficients of a single hairstyle from an input image;
        receive the input image; and
        synthesize hair strands to generate a single-view 3D model of the single hairstyle based on the volumetric autoencoder, the embedding network, and the input image.

8. The device of claim 7, wherein the flow field is determined by averaging orientations of nearby strands and diffusing the flow field into the volume represented by the occupancy field.

9. The device of claim 7, wherein training the volumetric autoencoder includes training the volumetric autoencoder to include a volumetric encoder to encode the plurality of 3D hairstyles into the latent features and an occupancy field decoder to decode the occupancy field representing the volume of the single hairstyle and an orientation field decoder to decode the flow field representing the orientation of hair strands of the single hairstyle to generate the output.

10. The device of claim 7, the memory including instructions further causing the neural network processor to perform Principled Component Analysis (PCA) on the hair coefficients.

11. The device of claim 7, the memory including instructions further causing the neural network processor to perform post-process on the single-view 3D model of the single hairstyle to place the single-view 3D model of the single hairstyle on at least one of a face or a head.

12. The device of claim 11, wherein the post-processing includes:
    segmenting a pixel-level hair mask and a digitized head model starting from the input image; and
    applying a mask-based deformation method to improve alignment with the hair mask.

13. A method for single-view 3D hair modeling, the method comprising:
    encoding, using a volumetric autoencoder, a plurality of 3D hairstyles into latent features by representing the plurality of 3D hairstyles using an occupancy field representing a volume of a specific hairstyle and a flow field representing an orientation of hair strands of the specific hairstyle;
    generating an output based on the latent features;
    determining hair coefficients of a single hairstyle from an input image;
    receiving the input image; and
    generating a single view 3D model of the single hairstyle based on the volumetric autoencoder, an embedding network and the input image.

14. The method of claim 13, wherein the flow field is determined by averaging orientations of nearby strands and diffusing the flow field into the volume represented by the occupancy field.

15. The method of claim 13, wherein encoding a plurality of 3D hairstyles into latent features includes training the volumetric autoencoder to include a volumetric encoder to encode the plurality of 3D hairstyles into the latent features and an occupancy field decoder to decode the occupancy field representing the volume of the single hairstyle and an orientation field decoder to decode the flow field representing the orientation of hair strands of the single hairstyle to generate the output.

16. The method of claim 13, further comprising performing Principled Component Analysis (PCA) on the hair coefficients.

17. The method of claim 13, further comprising placing the single-view 3D model of the single hairstyle on at least one of a face or a head.

* * * * *